US010977271B2

(12) United States Patent
McLean

(10) Patent No.: US 10,977,271 B2
(45) Date of Patent: *Apr. 13, 2021

(54) ADAPTIVE PARSING AND NORMALIZING OF LOGS AT MSSP

(71) Applicant: SECUREWORKS CORP., Wilmington, DE (US)

(72) Inventor: Lewis McLean, Edinburgh (GB)

(73) Assignee: Secureworks Corp., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/826,883

(22) Filed: Mar. 23, 2020

(65) Prior Publication Data

US 2020/0265063 A1 Aug. 20, 2020

Related U.S. Application Data

(63) Continuation of application No. 15/799,458, filed on Oct. 31, 2017, now Pat. No. 10,599,668.

(51) Int. Cl.
*G06F 21/00* (2013.01)
*G06F 16/25* (2019.01)
(Continued)

(52) U.S. Cl.
CPC ........ *G06F 16/258* (2019.01); *G06F 16/2365* (2019.01); *G06F 16/254* (2019.01);
(Continued)

(58) Field of Classification Search
CPC .. G06F 16/258; G06F 16/2365; G06F 16/254; G06F 40/205; G06F 40/295;
(Continued)

(56) References Cited

U.S. PATENT DOCUMENTS 6,115,686 A * 9/2000 Chung .................... G10L 13/08
704/260
7,653,633 B2 1/2010 Villella et al.
(Continued)

FOREIGN PATENT DOCUMENTS

CN 105005549 A 10/2015

OTHER PUBLICATIONS

Ross, Stephane; Gordon, Geoffrey J; and Bagnell, J. Andrew; *A Reduction of Imitation Learning and Structured Prediction to No-Regret Online Learning*; 14th International Conference on Artificial Intelligence and Statistics (AISTATS 2011), Fort Lauderdale, FL, USA; vol. 15 of JMLR; (Cited as: arXiv:1011.0686v3 [cs.LG]); Mar. 16, 2011; available at https://arxiv.org/pdf/1011.0686.pdf.
(Continued)

*Primary Examiner* — Ghodrat Jamshidi
(74) *Attorney, Agent, or Firm* — Womble Bond Dickinson (US) LLP

(57) ABSTRACT

A method of normalizing security log data can include receiving one or more security logs including unstructured data from a plurality of devices and reviewing unstructured data of the one or more security logs. The method also can include automatically applying a probabilistic model of one or more engines to identify one or more attributes or features of the unstructured data, and determine whether the identified attributes or features are indicative of identifiable entities, and tagging one or more identifiable entities of the identifiable entities, as well as organizing tagged entities into one or more normalized logs having a readable format with a prescribed schema. In addition, the method can include reviewing the one or more normalized logs for potential security events.

18 Claims, 6 Drawing Sheets

(51) Int. Cl.
| | |
|---|---|
| *H04L 29/06* | (2006.01) |
| *G06F 16/23* | (2019.01) |
| *G06F 40/205* | (2020.01) |
| *H04L 12/26* | (2006.01) |
| *H04L 12/24* | (2006.01) |
| *G06F 40/295* | (2020.01) |

(52) U.S. Cl.
CPC ........ *G06F 40/205* (2020.01); *H04L 63/1416* (2013.01); *H04L 63/1425* (2013.01); *G06F 40/295* (2020.01); *H04L 41/069* (2013.01); *H04L 43/18* (2013.01)

(58) Field of Classification Search
CPC ............. H04L 63/1416; H04L 63/1425; H04L 41/069; H04L 43/18
See application file for complete search history.

(56) References Cited

U.S. PATENT DOCUMENTS

| | | | |
|---|---|---|---|
| 9,384,112 B2 | 7/2016 | Petersen et al. | |
| 9,411,672 B1 | 8/2016 | Cooper et al. | |
| 9,483,583 B2 | 11/2016 | Braun et al. | |
| 10,594,713 B2 | 3/2020 | McLean | |
| 10,599,668 B2 | 3/2020 | McLean | |
| 2003/0217292 A1 | 11/2003 | Steiger et al. | |
| 2004/0193912 A1* | 9/2004 | Li | G06F 21/55 726/14 |
| 2009/0307640 A1* | 12/2009 | Chapman | G06F 30/398 716/136 |
| 2011/0153667 A1 | 6/2011 | Parmenter et al. | |
| 2011/0185055 A1* | 7/2011 | Nappier | H04L 63/1433 709/224 |
| 2013/0227519 A1* | 8/2013 | Maleport | H04L 67/34 717/106 |
| 2014/0040261 A1 | 2/2014 | Horne et al. | |
| 2014/0372105 A1* | 12/2014 | Manadhata | G06F 40/205 704/9 |
| 2015/0067839 A1* | 3/2015 | Wardman | G06F 21/563 726/22 |
| 2015/0264011 A1 | 9/2015 | Liang | |
| 2015/0271047 A1 | 9/2015 | McLean | |
| 2015/0324457 A1 | 11/2015 | McLean | |
| 2016/0217522 A1* | 7/2016 | Jnagal | G06Q 30/0627 |
| 2016/0371489 A1* | 12/2016 | Puri | H04L 63/1425 |
| 2017/0171228 A1 | 6/2017 | McLean | |
| 2017/0187734 A1 | 6/2017 | Lee et al. | |
| 2017/0214701 A1 | 7/2017 | Hasan | |
| 2017/0220218 A1 | 8/2017 | Zhao et al. | |
| 2017/0220664 A1* | 8/2017 | Rulev | G06F 40/205 |
| 2017/0223039 A1 | 8/2017 | Mont et al. | |
| 2018/0173812 A1* | 6/2018 | Agarwal | G06F 16/254 |
| 2018/0183821 A1* | 6/2018 | Schneider | G06F 16/285 |
| 2019/0130009 A1 | 5/2019 | McLean | |
| 2019/0149564 A1 | 5/2019 | McLean | |

OTHER PUBLICATIONS

Zhu, Jieming; He, Shilin; Liu, Jinyang; He, Pinjia; Xie, Qi; Zheng, Zibin and Lyn, Michael R.; *Tools and Benchmarks for Automated Log Parsing*; International Conference on Software Engineering (ICSE' 19); (Cited as: arXiv:1811.03509v2 [cs.SE]); Jan. 3, 2019; available at https://arxiv.org/pdf/1811.03509.pdf.

Messaoudi, Salma; Panichella, Annibale; Bianculli, Domenico; Briand, Lionel and Sasnauskas, Raimondas; *A Search-based Approach for Accurate Identification of Log Message Formats*; Proceedings of the 26th IEEE/ACM International Conference on Program Comprehension (ICPC' 18); Publisher ACM; pp. 167-177; May 27-28, 2018, Gothenburg, Sweden; available at http://publications.uni.lu/bitstream/10993/35286/1/ICPC-2018.pdf and http://orbilu.uni.lu/handle/10993/35286.

IEEE; He, Pinjia; Zhu, Jieming; He, Shilin; Li, Jian and Lyu, Michael R.; *Towards Automated Log Parsing for Large-Scale Log Data Analysis*; IEEE Transactions on Dependable and Secure Computing; vol. 15, Issue: 6; pp. 931-944; Oct. 13, 2017; available at https://ieeexplore.ieee.org/document/8067504 and https://pinjiahe.github.io/papers/TDSC17.pdf.

Hamooni, Hossein; Debnath, Bipolb; Xu, Jianwu; Zhang, Hui, Jiang, Guofei; and Mueen Abdullah; *LogMine: Fast Pattern Recognition for Log Analytics*; CIKM 2016; Oct. 24-28, 2016, Indianapolis, IN USA; available at https://www.cs.unm.edu/~mueen/Papers/LogMine.pdf.

Du, Min and Li, Feifei; *Spell: Streaming Parsing of System Event Logs*; 2016 IEEE 16th International Conference on Data Mining (ICDM), Dec. 12-15, 2016, Barcelona, Spain; Publisher: IEEE; available at https://ieeexplore.ieee.org/document/7837916 and https://www.cs.utah.edu/~lifeifei/papers/spell.pdf.

He, Pinjia; Zhu, Jieming; Zheng, Zibin and Lyu, Michael R.; *Drain: An Online Log Parsing Approach with Fixed Depth Tree*; 2017 IEEE International Conference on Web Services (ICWS), Jun. 25-30, 2017, Honolulu, HI, USA; Publisher: IEEE; available at https://ieeexplore.ieee.org/document/8029742 and https://www.bing.com/search?q=drain%3A+An+Online+Log+Parsing+Approach+with+Fixed+Depth+Tree&src=IE-SearchBox&FORM=IESR3N.

He, Pinjia; Zhu, Jieming; He, Shilin; and Lyn, Michael R. *An Evaluation Study on Log Parsing and Its Use in Log Mining*; 2016 46th Annual IEEE/IFIP International Conference on Dependable Systems and Networks (DSN), Jun. 28-Jul. 1, 2016; Toulouse, France; Publisher: IEEE; available at https://ieeexplore.ieee.org/document/7579781 and https://pinjiahe.github.io/papers/DSN16.pdf.

Makanju, Adetokunbo, A. Nur Zincir-Heywood and Milios, Evangelos E.; *A Lightweight Algorithm for Message Type Extraction in System Application Logs*; IEEE Transactions on Knowledge and Data Engineering; vol. 24, Issue: 11; pp. 1921-1936; Publisher: IEEE; Jun. 30, 2011; available at https://ieeexplore.ieee.org/document/5936060 and https://web.cs.dal.ca/~makanju/publications/paper/tkde11.pdf.

Tang, Liang; Li, Tao and Perng, Chang-Shing; *LogSig: Generating System Events from Raw Textual Logs*; Conference Proceedings of the 20th ACM Conference on Information and Knowledge Management, CIKM 2011, Oct. 24-28, 2011; Glasgow, United Kingdom; available at http://users.cis.fiu.edu/~lpeng/log/2_LogSig-%20Generating%20system%20events%20from%20raw%20textual%20logs.pdf and https://www.researchgate.net/publication/221615397_LogSig_Generating_system_events_from_raw_textual_logs.

Makanju, Adetokunbo; A. Nur Zincir-Heywood and Milios, Evangelos; *Clustering Event Logs Using Iterative Partitioning*; Proceedings of the 15th ACM SIGKDD International Conference on Knowledge Discovery and Data Mining; pp. 1255-1264; Jun. 28-Jul. 1, 2009, Paris, France; available at https://web.cs.dal.ca/~makanju/publications/paper/kdd09.pdf and https://dl.acm.org/citation.cfm?id=1557154.

Fu, Qiang; Lou, Jian-Guang; Wang, Yi and Li, Jiang; *Execution Anomaly Detection in Distributed Systems through Unstructured Log Analysis*; Microsoft Research Asia, Beijing, P.R. China and Dept. of Computer Science & Technology, Beijing University of Posts and Telecommunications, Beijing, P.R. China; ICDM Conference 2009, The Ninth IEEE International Conference on Data Mining; Miami, Florida, USA; Dec. 6-9, 2009; available at https://www.researchgate.net/publication/220765301_Execution_Anomaly_Detection_in_Distributed_Systems_through_Unstructured_Log_Analysis.

Lin, Hao; Zhou, Jingyu; Yao, Bin; Guo, Minyi and Li, Jie; *Cowic: A Column-Wise Independent Compression for Log Stream Analysis*; 2015 15th IEEE/ACM International Symposium on Cluster, Cloud and Grid Computing, May 4-7, 2015; Shenzhen, China; available at https://ieeexplore.ieee.org/document/7152468.

Mell, Peter and Harang, Richard E.; *Lightweight Packing of Log Files for Improved Compression in Mobile Tactical Networks*; 2014 IEEE Military Communications Conference, Oct. 6-8, 2014; Baltimore, MD, USA; available at https://ieeexplore.ieee.org/document/6956758.

Christensen, Robert and Li, Feifei; *Adaptive Log Compression for Massive Log Data*; SIGMOD' 13; (ACM978-1-4503-2037-May 13,

(56) References Cited

OTHER PUBLICATIONS

2006); Jun. 22-27, 2013; New York, New York, USA; available at https://www.cs.utah.edu/~lifeifei/papers/compresslog.pdf.

Racz, Balazs and Lukacs, Andras; *High Density Compression of Log Files*; Proceedings of the Data Compression Conference (DCC 2004); 1068-0314/04; Apr. 2004 IEEE; available at https://www.academia.edu/3143402/High_density_compression_of_log_files and https://www.researchgate.net/publication/4065440_High_density_compression_of_log_files.

GitHub; *A toolkit for making domain-specific probabilistic parsers*; https://github.com/datamade/parserator; available Jan. 8, 2019.

Wikipedia; *Frequent pattern discovery*; https://en.wikipedia.org/wiki/Frequent_pattern_discovery; last edited on Mar. 22, 2019.

GitHub; *awesome-log-analysis*; https://github.com/logpai/awesome-log-analysis/blob/master/papers.md#log-parsing; last updated Aug. 11, 2019.

Wikipedia; *Grammar induction*: https://en.wikipedia.org/wiki/Grammar_induction; lasted edited on Jul. 23, 2019.

Ju, Meizhi; Miwa, Makoto and Ananiadou, Sophia; *A Neural Layered Model for Nested Named Entity Recognition*; Conference Proceedings of the 2018 Conference of the North American Chapter of the Association for Computational Linguistics: Human Language Technologies; vol. 1; pp. 1446-1459, New Orleans, Louisiana, Jun. 1-6, 2018; available at https://www.aclweb.org/anthology/N18-1131 and https://www.researchgate.net/publication/325447158_A_Neural_Layered_Model_for_Nested_Named_Entity_Recognition.

Wikipedia; *Lexical analysis*: https://en.wikipedia.org/wiki/Lexical_analysis#Lexeme; last edited on Aug. 6, 2019.

Wikipedia; *Active learning*; https://en.wikipedia.org/wiki/Active_learning; lasted edited on Jul. 2, 2019.

Wikipedia; *Whitespace character*; https://en.wikipedia.org/wiki/Whitespace_character#Unicode; last edited on Aug. 13, 2019.

\* cited by examiner

ADAPTIVE PARSING AND NORMALIZING OF LOGS AT MSSP

CROSS REFERENCE TO RELATED APPLICATIONS

This application is a continuation application of U.S. patent application Ser. No. 15/799,458 filed on Oct. 31, 2017.

INCORPORATION BY REFERENCE

U.S. patent application Ser. No. 15/799,458, which was filed on Oct. 31, 2017, is hereby incorporated by reference for all purposes as if presented herein in their entireties.

BACKGROUND

Managed security services providers ("MSSP") generally provide real-time monitoring of networks and system infrastructure of their customers, e.g., network hardware and applications, to proactively search for and address potential security threats; and typically log or otherwise accumulate activity data on such networks and infrastructure. A single MSSP may track and log activity for thousands of individual clients, and in doing so, MSSPs may ingest logs from hundreds of different device types, including hundreds of thousands of user devices, thereby generating and/or receiving potentially billions of activity logs each day. As these logs come in, it is necessary that they quickly and efficiently be normalized to a machine understandable format, and analyzed to detect/determine possible security issues. Different clients serviced by a MSSP, however, may format their data or network information in a variety of different ways, e.g., with different syntax, formats, etc., and further may utilize a number of different type devices running a variety of software programs and/or variations/versions thereof. As a result, though the received logs may contain substantially the same information, it can be received in a wide ranging variety of different formats, many of which often may not be easily translatable.

Accordingly, accumulated logs typically have to be normalized, adapted, or curated for security information event monitoring ("SIEM"), for example, by parsing or other suitable syntax or syntactic analysis that employs rule-based systems designed to normalize unstructured/raw log data. Depending on the number of customers, devices, systems, etc., being monitored, this can result in thousands of parsing scripts or schema being generated to normalize various differing log formats. The normalization, adaptation, and/or rule curation is a heavily data intensive and very time critical process, and MSSPs generally have to operate large data engineering teams for generating such parsing scripts and managing the tens of thousands of parsing scripts enabled for the process of normalization, adaptation, or curation of the incoming logs on their monitoring platform(s). Such teams further must take on extensive work to create new scripts and/or amend existing scripts when log formats are changed or when the MSSP takes on new clients. For example, when software patches or infrastructures changes, log values and formats also can change, which has the potential to create problems for existing rule based normalization methods or existing parsing scripts, requiring such scripts to be changed/updated and/or additional parsing scripts to be generated. The effect of a change or update also can have an effect on security monitoring, for example, leaving clients vulnerable to security attacks during the time that scripts must be updated, particularly when clients do not inform the MSSP that such changes/updates have occurred, since existing parsing may not be able to properly format new, unstructured data.

Accordingly, it can be seen that a need exists for more efficient ways to manage data accumulation and adaptively monitor incoming security log data. The present disclosure addresses these and other related and unrelated problems in the art.

SUMMARY

Briefly described, the present disclosure is, in one aspect, directed to security systems and event detection and management services for security monitoring of event/security logs generated from a variety of differing customer or client networks and platforms, such as information handling systems and networked systems managed by the customers or clients. In one embodiment, the security systems may aggregate or otherwise ingest a plurality of security logs or other suitable records generated at least in part on monitored activity of customer's or client's networked systems. For example, the security systems can include one or more monitoring devices in communication with the customer or client networked systems, and which are operable to aggregate event/security logs, or in the alternative, the clients or customers can perform internal collection monitoring of event/security logs and provide aggregated event/security logs to their MSSP managing the security system.

The security system further will include one or more engines configured to utilize an adaptive parsing strategy and operable to dynamically normalize, curate, adapt, and/or parse the plurality of event/security logs, for example, to place unstructured/raw data from the aggregated or ingested security/event logs into a suitable machine readable format, schema, rule, regex, etc., to facilitate security information and event management. Such engines can tag or otherwise identify a series of entities or common attributes in the incoming unstructured log data, based at least in part on probabilistic recognition of one or more attributes or features of the entities to be extracted or tagged. In one exemplary embodiment, the engines can use Named Entity Recognition ("NER") as part of or in addition to a National Language Processing ("NLP") operation, to encode attributes of the identified and/or selected entities based on heuristics as applied to one or more sets of training data. Such training data typically can include historical data from incoming logs that have been analyzed and normalized using existing parsing scripts, manually or otherwise; and will be used by the engine(s) to generate or develop a recognition and/or understanding of particular identifiable commonalities, features and/or attributes of entities of the incoming logs in order to enable the engine(s) to thereafter substantially automatically/dynamically identify and extract such attributes, entities or common sequences or patterns in incoming unstructured log data that may be presented or received in new or different formats.

Based on development of the one or more engines ability to recognize and extract commonalities/identifiable features or entities across different log formats, the engine(s) can thereafter receive, analyze incoming logs in newer, different or unrecognized formats, and identify, parse and/or normalize selected key attributes or features thereof based on a prescribed, threshold probability the particular selected attributes, or sequence thereof, have been identified. For example, a prescribed confidence level that the particular attributes or features are indicative of a specific entity, can be used to decide/determine whether and/or which attributes of the incoming logs represent a specific entity of the plurality of entities such that the identified entities can be tagged or otherwise identified. Tagged entities can then be placed into a structured format or other suitable database or structured data set with a prescribed schema to facilitate event detection and management analysis thereof. As a result, even in the event of new or unrecognized format logs coming in, the security system may still be enabled to automatically analyze or otherwise monitor the normalized event/security log data to determine the presence or occurrence of one or more security events, such as a malicious attack or a suspicious log in, and in response to the determination of the occurrence of one or more security events, generate an alarm or otherwise notify the clients/customers, without the necessity of new parsing scripts or notifications or changes having to be made to existing scripts.

Accordingly, with embodiments of the present disclosure, the security system can automatically normalize unstructured log data having different information, including logs from a variety of diverse clients using different formats, syntax, etc., or devices operating on different platforms, e.g., Windows®, Apple®, Cisco®, etc., thereby reducing costs and time required to manually generate parsing scripts to normalize unstructured data. Additionally, when a new client provides unstructured or unrecognized format logs for security monitoring, or when an existing client makes changes or updates to their systems or software, resulting in a change to their logs, a large number scripts will not have to be manually updated or generated to normalize the provided unstructured log data. Also, the potential risk of overlooking or otherwise missing a malicious attack or security event, during or after an update or change to a client's/customer's information handling networks and systems can be substantially minimized.

In another aspect, the present disclosure includes a method for providing security information and event management for a plurality of clients/customers of an MS SP. The method will include creation and development of one or more engines trained utilizing existing and/or historical data parsed according to known parsing scripts or rules (filters), or otherwise, to create or derive a training set of entity data or attributes that can be identified and extracted from incoming logs using a probabilistic recognition of various features or such entities (e.g., punctuation, spacing, place in line, full stops, etc.), based upon selected/recognized and/or historically observed commonalities of such entities. Thereafter, as incoming security/event logs containing unstructured or unrecognized log data are generated/received from monitored customer/client networks and platforms, the method further includes dynamically and/or automatically normalizing the unstructured data of the security logs using the one or more trained statistical engines.

In a further aspect, the dynamic/automatic normalizing of the unstructured data further may include identifying one or more attributes or features, or sequences or combination thereof, and determining whether the identified attributes/features are indicative of one or more specific entities of a plurality of entities based at least in part on a prescribed confidence interval, heuristics, or other threshold probability, using the one or more trained statistical engines. The method then can include placing the identified entities into a structured, machine readable format sufficient to using the engine(s), and/or alternatively, for formatting or placing the log(s) in a condition so as to enable analysis by an existing or prescribed schema, to enable the identification or detection of one or more security events therein. Upon identification of one or more security events, the method further can include generating one or more alerts or other notifications to inform the clients/customers of the detected security event(s).

Various objects, features and advantages of the present invention will become apparent to those skilled in the art upon a review of the following detail description, when taken in conjunction with the accompanying drawings.

BRIEF DESCRIPTION OF THE FIGURES

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
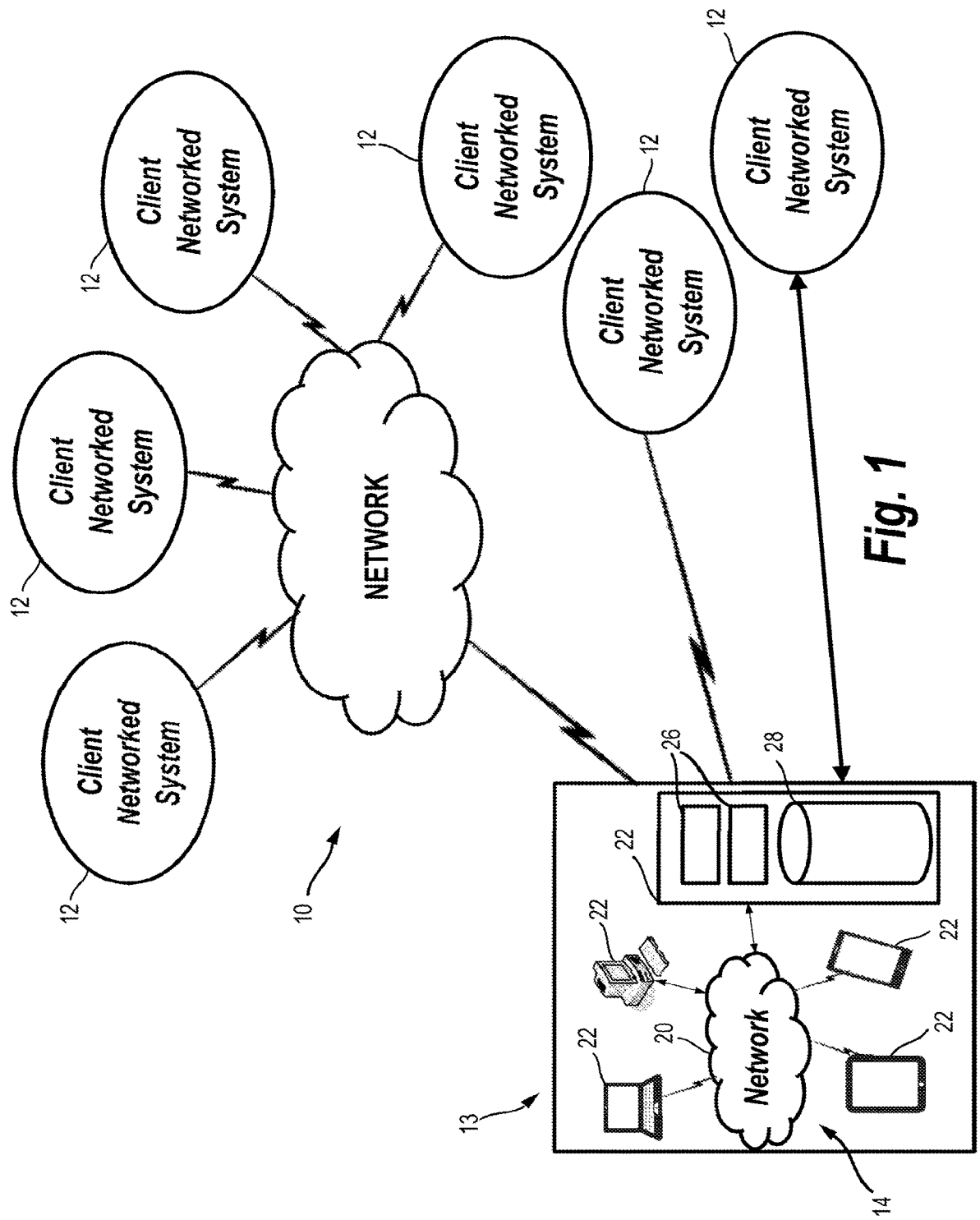
FIG. 1 is a schematic diagram of a system for security information and event management according to one aspect of the present disclosure.

FIG. 1 shows a block diagram of a system 10 for security information and event management that is operable to monitor event/security logs generated from a variety of differing customer/client networks and platforms, such as networked systems 12 managed by the customers/clients. As shown in FIG. 1, the client/customer networked 12 can be in communication with an event management center 13 including one or more data management centers 14 managed by an MSSP. The networked systems 12 can communicate with the data center 14 through a network 16, such as a public or private network, e.g., a local area network, though client/customer information handling systems 12 can be in communication with the data center 14 through other suitable lines of communication 18, such as peer to peer file sharing systems, or other suitable wireless, virtual, and/or wired connections. The data center 14 can include one or more internal networks 20 with a plurality of information handling systems 22, such as servers, personal computers, laptops, tablets, workstations, smart phones, personal data assistants, etc., connected thereto. In one embodiment, the information handling systems 22 can include processor 26 and a memory or other suitable storage mediums 28. The memory 28 can include a random access memory (RAM), read only memory (ROM), and/or other non-transitory computer readable mediums.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system also may include one or more buses operable to transmit communications between the various hardware components.

Figure 2:
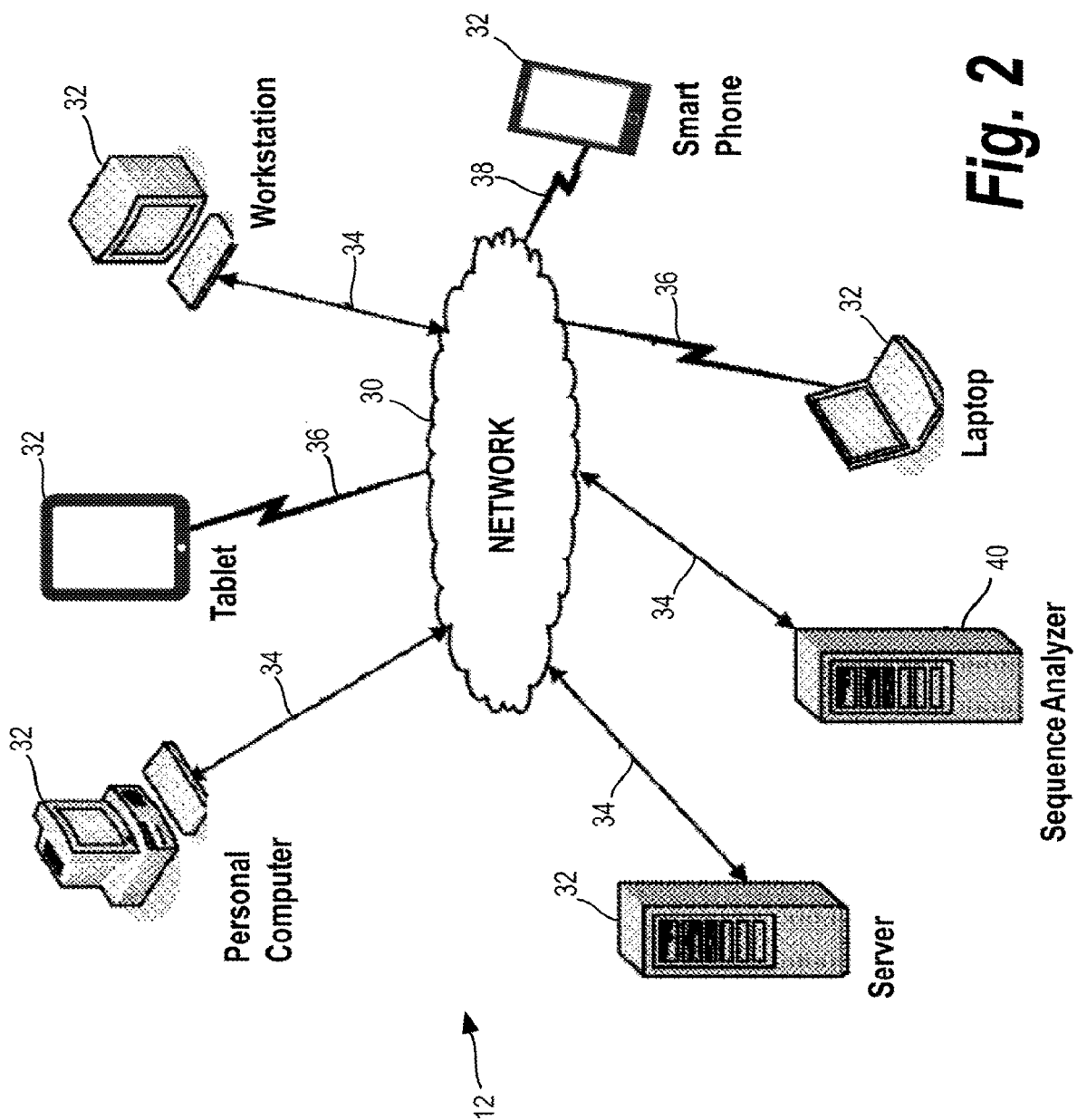
FIG. 2 is a schematic diagram of a client/customer networked system of information handling systems according to one aspect of the present disclosure.

FIG. 2 is a block diagram of client/customer networked systems 12. The systems 12 can include a network 30, which may include the internet or another wide area network, a local area network, or a combination thereof. The network 30 may provide data communications among a series of information handling systems 32, which can include workstations, personal computers, smart cellular telephones, a personal digital assistants, laptop computers, servers, and other suitable devices. The information handling systems 32 can be coupled to the network 30 through wireline connections 34, wireless connections 36, cellular connections 38, or other suitable lines of communication. In some aspects, the information handling systems 32 of the networked systems 12 generally can be configured for a specific user or a specific use, such as financial transaction processing, airline reservations, enterprise data storage, or global communications, etc.

As shown in FIG. 2, client/customer networked systems 12 further may include one or more monitoring devices 40 communicatively coupled to the network 30, for example, through a wired connection 34, though or other suitable connections, such as a wireless connection, also can be used. The monitoring devices 40 may include a server or sequence analyzer or other client suitable computing device that has a processor 42 and a memory 44 or other suitable storage. The memory 44 can include a random access memory (RAM), read only memory (ROM), and/or other non-transitory computer readable medium. The monitoring devices 40 further typically will be operable to store and execute computer readable instructions to continuously monitor, in real-time, activity at each networked system 12, for example, activity of the information handling systems 32 connected to network 30. Such monitored activity can include, by way of example, logging on and off of the networks by the information handling systems 32, downloads or uploads, changes to settings, etc. Additionally, network activities such as executed processes (i.e., type, number of times accessed, resulting actions, etc.), types and/or numbers of files modified, net flow aggregate, and other, similar activities also can be monitored and collected as part of security log data/records.

The monitoring devices 40 in each client/customer networked system 12 additionally can be configured to aggregate or ingest a plurality of security logs or other suitable records, based at least in part on monitored activity of the plurality of devices 18 and the client's networks or systems. The plurality of security logs may be stored in the memory or storage 44 of the monitoring devices 40 and can be communicated to and/or accessed by the MSSP providing security services for the clients. For example, each monitoring system 40 may automatically send the aggregated security logs to the one or more servers at the MSSP data center, or the MSSP can otherwise directly access the security logs from the storage of the monitoring devices. It should be recognized, however, that providing monitoring devices 40 at the client/customer networked systems 12 alternatively can be optional, such that clients/customers can independently monitor their own networked systems, for example, using one or more of the information handling devices 32, and otherwise provide aggregated log data to the MSSP for normalization and monitoring of security events.

The security system 10 also will include one or more engines configured and operable to automatically and/or dynamically normalize, curate, adapt, and/or parse the plurality of security logs containing raw or unstructured data into a suitable format, schema, rule, etc., for example, to allow for security information and event management by enabling the MSSP to identify one or more security events at the client center. The engines can include workflows, software programs, computer readable instructions, or other computer readable information, that can be stored in the memory/storage 28 of one of the information handling systems 22 of data center 14, or alternatively can be stored in the storage or memory 44 of the monitoring systems 40 provided with the client/customer networked systems 12. The one or more engines further can be accessible from the memory or storage 28/44 by the processors 26/42 and such that the processors can carry out the instructions, procedures, workflows, etc., provided thereby.

Figure 3:
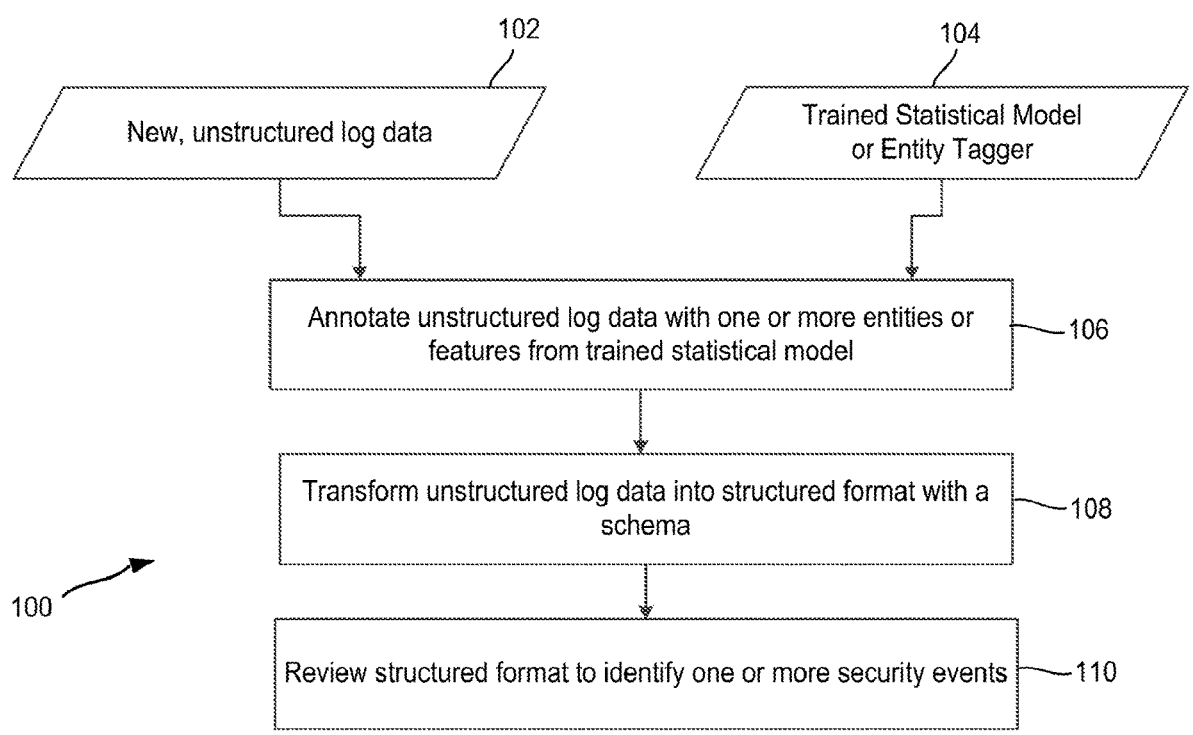
FIG. 3 is a flow diagram illustrating a process for providing security information and event management.

FIG. 3 provides a block diagram of the process 100 developed and utilized for the one or more engines for statistical normalization of unstructured logs and/or unrecognized formatted logs. As shown in FIG. 3, at block 102, logs including unstructured data can be provided to or obtained by the one or more engines. The one or more engines can include a trained statistical entity tagger 104. The statistical entity tagger 104 will be trained and operable to identify or tag one or more entities in the unstructured log data based at least in part on one or more attributes or commonalities of the entities. In addition, the engine may use probabilistic modeling, such as using Named Entity Recognition (NER) applied as part of Natural Language Processing (NLP) of the incoming logs, to determine whether specific attributes or commonalities, or sequences thereof, in the unstructured log data are indicative of one or more identifiable entities. Other suitable models are also possible with the present disclosure, such as neural networks, fuzzy logic, or other statistical models.

For example, based upon training data developed from historical logs parsed according to existing parsing scripts or rules, the engine will identify one or more prescribed attributes or features, e.g., number of full stops, special punctuation, a specific string of text, or other attributes, or sequence(s) or combination(s) thereof, and determine/encode such identified attribute(s) represent one or more specific entity(ies) based on threshold probability, heuristic value, or confidence level. Thereafter, the unstructured log data can be annotated with one or more entities from the trained statistical model at block 106, the identified entities isolated and tagged to transform the unstructured log data into a structured format that can be in accordance with a prescribed schema, as shown at block 108. With the log data in a structured or readable format, the MSSP can review the structured format to identify one or more security (or SIEM) events to enable monitoring at the client centers (at block 110).

Accordingly, the system 10 can provide an adaptive tolerant parsing strategy that is not bound by regular expressions and scripts, and instead dynamically identifies entities, such as IP addresses or usernames or other suitable entities, using probabilistic recognition of attributes, features, or commonalities of such entities. This system additionally can adapt to changes in format, for example, when the MSSP receives logs from a new client or when an existing client updates or changes their network, software, etc.

Figure 4:
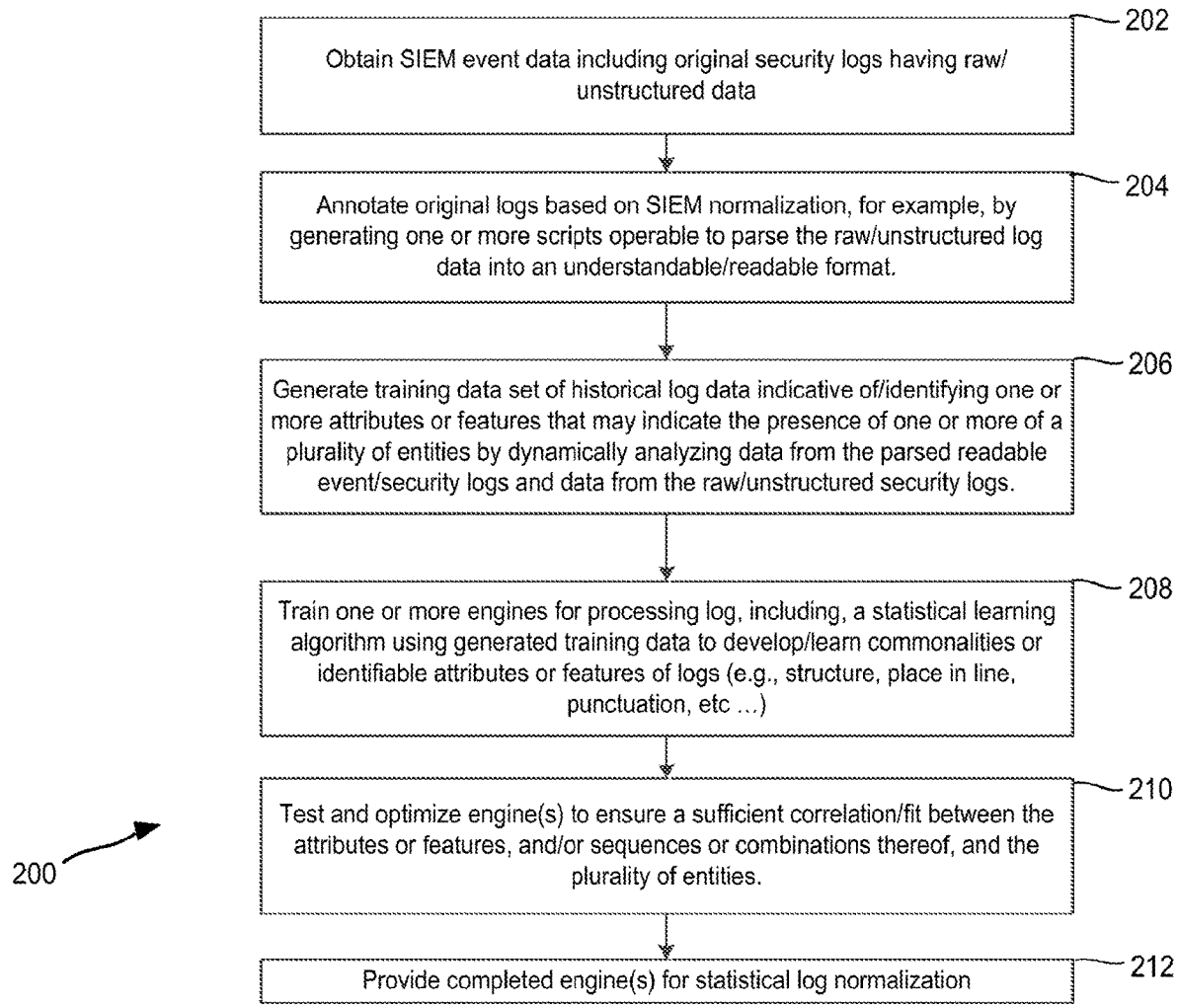
FIG. 4 is flow diagram for a statistical log normalization application using one or more engines according to principles of the present disclosure.

FIG. 4 shows a block diagram of a process flow 200 for training the one or more engines providing statistical log normalization. As shown in FIG. 4, the training process generally includes obtaining SIEM event data at block 202, which SIEM event data will be used to create one or more training data sets that can be reviewed using a supervised training platform, such as using Conditional Random Fields (CRF) to identify various attributes of identifiable or selected entities and assign probabilistic recognition values therefor. Such SIEM data used to develop the training data for the engine(s) can include, for example, original security logs having new/unstructured data, and in addition or alternatively can include historical log data that has been parsed and/or organized into a readable structure or format, e.g., with specific entities provided in a common format, using existing parsing scripts or rules, such as for a particular customer, software platform, etc. As the database is further developed and verified, it also can be supplemented with additional unstructured log data that has been normalized by manually parsing scripts, and/or with data processed by one or more trained statistical engines. The process also can include annotating the original security log data based on SIEM normalization thereof, for example, by generating one or more scripts operable to parse the new unstructured data into an understandable/readable format (block 204).

At block 206, a training data set will be generated for the engine or engines, which training data can include historical log data that has been normalized/parsed using existing parsing scripts or rules for a particular client, software, etc., and which will be indicative of or helps to identify one or more attributes or features that may indicate the presence of one or more of a plurality of entities. In one embodiment, the training log data can be generated by dynamically analyzing data from historical and incoming parsed or readable SIEM event/security logs, and using additional data from raw/unstructured security logs, analyzed using CFR and/or Named Entity Recognition (NER) applied to the incoming log text to encode and develop probability values for known and/or identifiable attributes thereof. The training data set thereafter can be used to dynamically train and/or update the one or more engines (block 208). For example, the engine may correlate tagged entities from the structured SIEM event data with their corresponding unstructured entities and build a probability model for the unstructured entities. The engine also may look to specific components of an entity, such as a user name, in the structured data and compare it with specific components of the unstructured data to build a database of identifiers or attributes, e.g., a number of full stops, spaces, specific string of text, etc., that provide a specific probability that the attributes are indicative of the entity, e.g., the user name. Once developed with a selected or desired level of confidence that the engine's identification of selected entities or attributes of incoming logs meets a desired probability, the engines then can be applied to the unstructured data to test the differences of normalization and can be optimized by, e.g., adjusting confidence intervals, rules for features/attributes, etc., to ensure a sufficient correlation/fit between the attributes/features, and/or sequences or connections thereof, and the plurality of entities (at block 210). A trained engine can then be provided for adaptive, automatic, and dynamic normalizing of unstructured data in one or more aggregated security logs (block 212).

Figure 5:
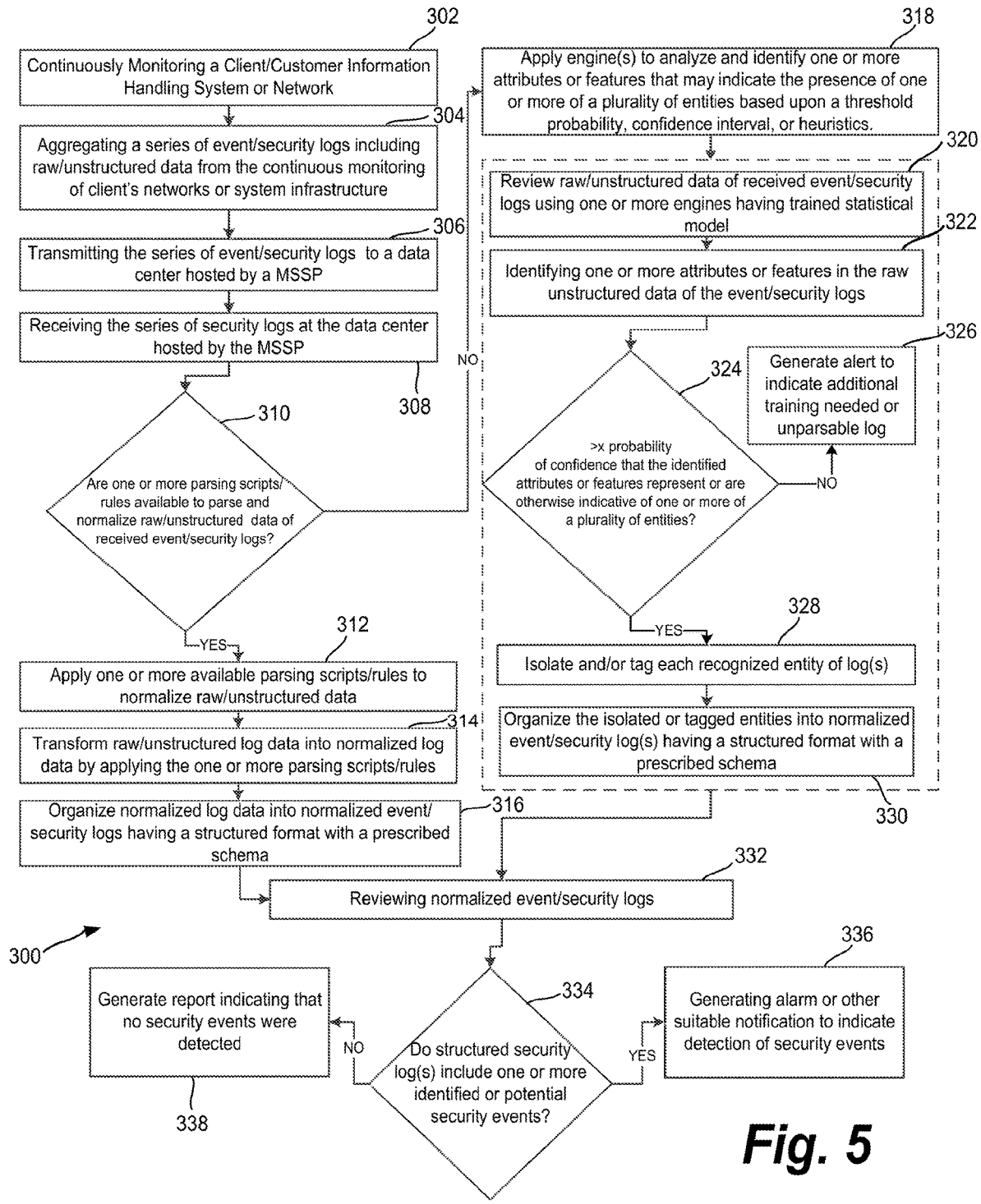
FIG. 5 shows a flow diagram for a statistical log normalizer training of the one or more engines.

FIG. 5 shows a process flow 300 for a method of providing security information and event management for the plurality of client/customer networked systems according to principles of the present disclosure. At block 302, the method can include continuously monitoring the networked systems 12 for each client/customer of the plurality of clients/customers, such as using one or more security monitoring devices or systems 40. The monitoring devices 40 can aggregate or ingest a series of event/security logs including unstructured data from the continuous monitoring of client's/customer's networked systems 12 (block 304). The monitoring devices 40 further can transmit the series of security logs to a data center 14 hosted by a MSSP (block 306).

At block 308, the data center 14 hosted by the MSSP can receive the series of aggregated security logs having unstructured or raw data, for example, the aggregated security logs can be received by an information handling device 22 at the MSSP data center and stored in a memory or storage 28 thereof. At block 310, a determination is made as to whether one or more parsing scripts/rules are available to parse and/or normalize raw/unstructured data of the received event/security logs (block 310). If existing parsing scripts are available (i.e., YES at decision block 310), then one or more available/existing parsing scripts will be applied to normalize the new/unstructured data (block 312), and will transform the new/unstructured data into normalized log data (block 314). The normalized log data thereafter can be organized into normalized event/security logs having a structured format with a prescribed schema (block 316). The normalized logs then can be reviewed for identified or potential security events (block 332).

If one or more parsing scripts are not available (i.e., NO at decision block 310), an engine(s) may be applied to analyze and identify one or more attributes or features that may indicate the presence of a plurality of entities based upon a threshold probability, confidence, interval, heuristics, etc. (block 318). For example, the information handling device(s) 22 can access/store the engine(s) from/in the storage 28, which engines can be run on/executed by the processor 26 to automatically and dynamically normalize the unstructured data in the plurality of received event/security logs, which, for example, utilizes statistical models, e.g., NER, to identify one or more attributes or features, and/or sequences or combinations thereof, in the raw/unstructured data, and determine whether the identified attributes are likely to represent the presence of an entity or entities, such as a user name, log in time, etc., in the unstructured data using heuristics, a threshold probability or set confidence interval.

For example, at block 320, the one or more engines will review the raw/unstructured data of the received event/ security logs, and will identify one or more attributes or features in the raw/unstructured data of the event/security logs at block 322. At block 324, it will be determined whether a prescribed probability of confidence that the identified attributes or features represent or are otherwise indicative of the presence of one or more entities exceeds a threshold value. If the threshold value is exceeded, the recognized entities will be isolated and/or tagged (block 328). If the prescribed probability of confidence is not exceeded or otherwise met for any of the identified attributes/features, an alarm can be generated to indicate that more training is needed or it is an unpassable log (block 326). At block 330, isolated or tagged entities can be organized by the engine into normalized event/security logs having a structured format with a prescribed schema. The structured/normalized event/security log data can be reviewed at block 332.

Thereafter, at block 334, a determination can be made as to whether the normalized event/security logs (either from the parsing scripts or engines) contain one or more security events. If so, an alarm can be generated to notify the client/customers of the one or more security events and/or potential steps/actions to take in view of the specific security events (block 336). If not, a report can be generated to indicate that no security events were detected (block 338).

Figure 6:
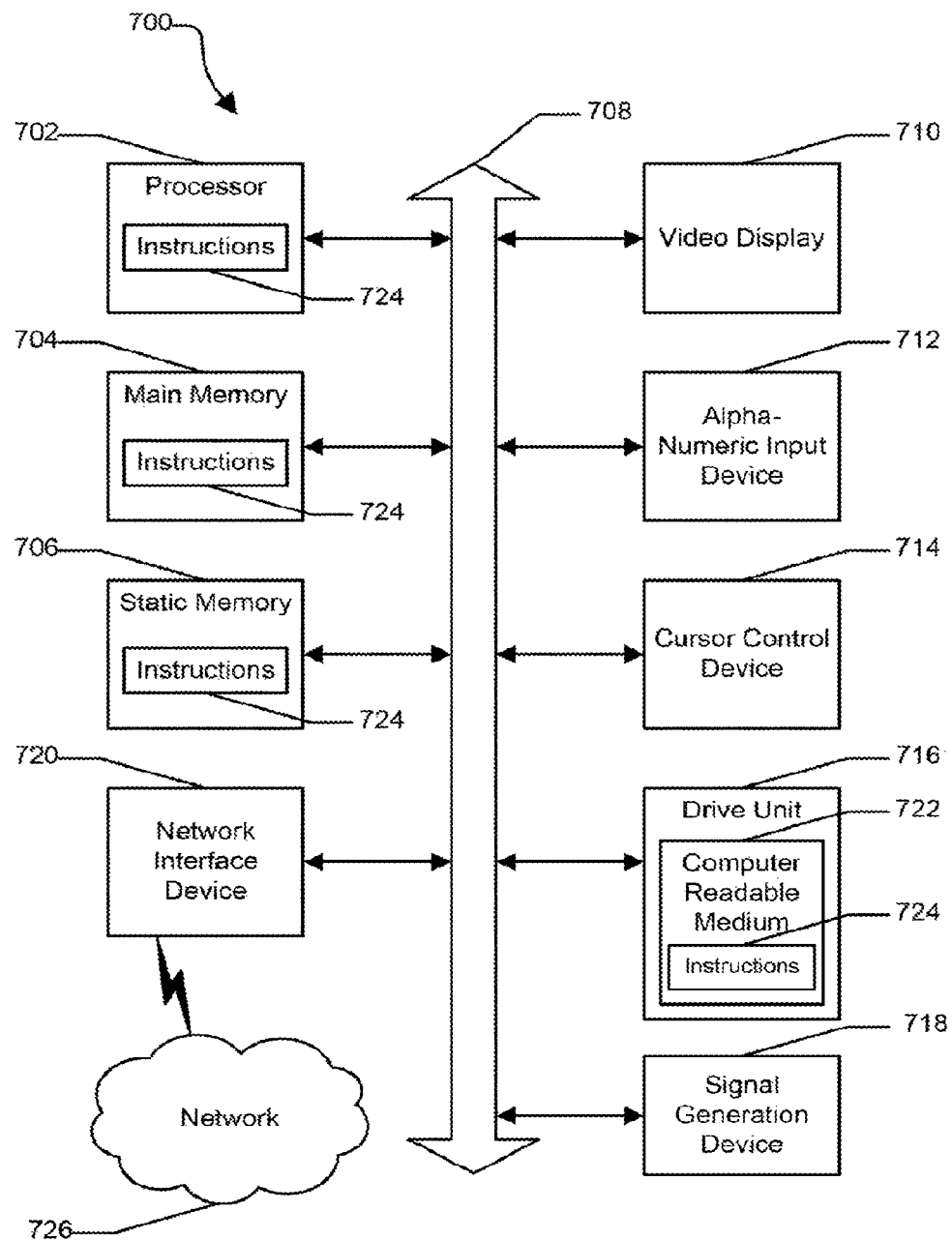
FIG. 6 is a block diagram illustrating an information handling system according to one example of the present disclosure.

FIG. 6 shows an example of an information handling system 700 capable of administering each of the specific embodiments of the present disclosure. The information handling system 700 can represent the user information handling systems 22, 32, and 40 of FIGS. 1 and 2. The information handling system 700 may include a computer system or processor 702 such as a central processing unit (CPU), a graphics processing unit (GPU), or both. Moreover, the information handling system 700 can include a main memory 704 and a static memory 707 that can communicate with each other via a bus 708. The information handling system 700 includes near-field communications (NFC) device and interface 718, such as an antenna and NFC subsystem. The information handling system 700 can also include a disk drive unit 716, and a network interface device 720. As shown, the information handling system 700 further may include a video display unit 710, such as a liquid crystal display (LCD), an organic light emitting diode (OLED), a flat panel display, a solid state display, or a cathode ray tube (CRT), or other suitable display. The video display unit 710 may also act as an input accepting touchscreen inputs. Additionally, the information handling system 700 may include an input device 712, such as a keyboard, or a cursor control device, such as a mouse or touch pad, or a selectable interface on the display unit. Information handling system may include a battery system 714. The information handling system 700 can represent a device capable of telecommunications and whose can be share resources, voice communications, and data communications among multiple devices. The information handling system 700 can also represent a server device whose resources can be shared by multiple client devices, or it can represent an individual client device, such as a laptop or tablet personal computer.

The information handling system 700 can include a set of instructions that can be executed to cause the processor to perform any one or more of the methods or computer based functions disclosed herein. The processor 702 may operate as a standalone device or may be connected such as using a network, to other computer systems or peripheral devices.

In a networked deployment, the information handling system 700 may operate in the capacity of a server or as a client user computer in a server-client user network environment, or as a peer computer system in a peer-to-peer (or distributed) network environment. The information handling system 700 can also be implemented as or incorporated into various devices, such as a personal computer (PC), a tablet PC, a set-top box (STB), a smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single information handling system 700 is illustrated, the term "system" shall also be taken to include any collection of systems or subsystems that individually or jointly execute a set, or multiple sets, of instructions to perform one or more computer functions.

The disk drive unit 716 or static memory 714 may include a computer-readable medium 722 in which one or more sets of instructions 724 such as software can be embedded. The disk drive unit 716 or static memory 714 also contains space for data storage. Further, the instructions 724 may embody one or more of the methods or logic as described herein. In a particular embodiment, the instructions 724 may reside completely, or at least partially, within the main memory 704, the static memory 706, and/or within the processor 702 during execution by the information handling system 700. The main memory 704 and the processor 702 also may include computer-readable media. The network interface device 720 can provide connectivity to a network 726, e.g., a wide area network (WAN), a local area network (LAN), wireless network (IEEE 702), or other network. The network interface 720 may also interface with macrocellular networks including wireless telecommunications networks such as those characterized as 2G, 3G, 4G, 5G, LTE or similar wireless telecommunications networks similar to those described above. The network interface 720 may be a wireless adapter having antenna systems 732 for various wireless connectivity and radio frequency subsystems 730 for signal reception, transmission, or related processing.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal; so that a device connected to a network 728 can communicate voice, video or data over the network 728. Further, the instructions 724 may be transmitted or received over the network 728 via the network interface device 720. In a particular embodiment, BIOS/FW code 724 reside in memory 704, and include machine-executable code that is executed by processor 702 to perform various functions of information handling system 700.

Information handling system 700 includes one or more application programs 724, and Basic Input/Output System and Firmware (BIOS/FW) code 724. BIOS/FW code 724 functions to initialize information handling system 700 on power up, to launch an operating system, and to manage input and output interactions between the operating system and the other elements of information handling system 700.

In another embodiment (not illustrated), application programs and BIOS/FW code reside in another storage medium of information handling system 700. For example, application programs and BIOS/FW code can reside in drive 716, in a ROM (not illustrated) associated with information handling system 700, in an option-ROM (not illustrated) associated with various devices of information handling system 700, in storage system 707, in a storage system (not illustrated) associated with network channel 720, in another storage medium of the information handling system 700, or a combination thereof. Application programs 724 and BIOS/FW code 724 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile, read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A security system for a network, comprising:
an event management center including at least one processor configured to:
receive security log data from a plurality of monitored devices;
determine whether one or more parsing scripts or rules are available to parse or normalize the security log data; and
if one or more parsing scripts or rules are available to parse or normalize the security log data:
apply the one or more parsing scripts or rules to the security log data;
normalize the security log data and organize the normalized securing log data into a structured format; and
if the security data is in an unrecognized format or a parsing script or rule is not available to parse or normalize the security log data, transfer the security data to one or more engines for parsing or normalizing, the one or more engines stored in a memory of or accessible by the at least one processor;
wherein at least one of the engines is configured to:
receive the security log data that is in an unrecognized format or that is at least partially un-parsable by the one or more parsing scripts or rules accessible by the at least one processor;
identify at least one attribute of the security log data;
determine a probability that the at least one identified attribute represents one or more recognized security log entities; and
if the determined probability meets or exceeds a predetermined threshold probability, isolate and/or tag recognized security log entities, and organize isolated and/or tagged the recognized security log entities into a structured format to generate normalized security logs;
wherein the normalized security logs are reviewable to determine if a security threat has been detected.

2. The system of claim 1, wherein the event management center comprises a data center of a managed security service provider.

3. The system of claim 1, wherein the event management center comprises a network server.

4. The system of claim 1, wherein the at least one processor includes programming to identify identifiable entities of incoming security logs and select and apply a parsing script or rule corresponding to the identified security log.

5. The system of claim 4, wherein if the at least one processor is unable to identify an entity of an incoming security log with a prescribed level of confidence the processor forwards the incoming security log to the at least one engine.

6. The system of claim 1, further comprising one or more training data sets generated for each of the one or more engines, the one or more training data sets including historically identified features or attributes indicative of identifiable entities of the security logs received by the event management center.

7. The system of claim 1, wherein the one or more engines further include programming to perform probabilistic modeling to determine whether selected attributes, features, commonalties, and/or sequences thereof are indicative of one or more of the identifiable entities of the security logs.

8. The system of claim 1, wherein the probabilistic modeling includes named entity recognition.

9. A method of normalizing security log data, comprising:
receiving security logs sent from a plurality of devices;
for each security log received, determining whether a parsing script is available to normalize the security log data thereof;
if a parsing script is determined to be available for a received security log, selecting a parsing script, normalizing the security log data with the selected parsing script, and placing the security log into a normalized event format for review of a potential security event;
if a parsing script is not determined to be available for a received security log, routing the security log to one or more engines configured to:
review unconstructed security log data of the security log;
identify one or more attributes or features of the security log data of the security log;
determine whether the identified attributes or features are indicative of one or more identifiable entities, and if so, tag the identifiable entities; and
organize the tagged identifiable entities into a structured format using a prescribed schema; and
review the normalized security logs to determine potential security events.

10. The method of claim 9, further comprising generating training data sets for training the one or more engines.

11. The method of claim 10, further comprising updating the training data sets with security log data processed by the one or more engines.

12. The method of claim 9, further comprising dynamically analyzing sets of data from parsed or readable security logs and sets of data from raw or unstructured security logs and generating training data for training the one or more engines.

13. The method of claim 9, wherein the engines further include probabilistic modeling to determine whether selected attributes, features, commonalties, or sequences thereof, are indicative of one or more identifiable entities of the security logs.

14. The method of claim 9, wherein if one or more attributes of the unparsed security log are not identifiable with one or more known entities of the incoming security logs with the prescribed level of confidence, generating an alert.

15. A method of normalizing security log data, comprising:
receiving security logs comprising unstructured data from a plurality of monitored devices;
reviewing the unstructured data of each of the security logs to determine whether one or more parsing scripts or rules are available for parsing and/or normalization of the unstructured data;
if one or more parsing scripts or rules are available to parse or normalize the unstructured data, applying at least one selected parsing script or rule to the unstructured data for parsing or normalization of the unstructured data into a normalized log;
if one or more parsing scripts or rules are not available to parse or normalize the unstructured data, applying a probabilistic model of one or more engines to identify one or more attributes or features of the unstructured data, and determine whether the identified attributes or features are indicative of at least one identifiable entity;
tagging one or more identifiable entities indicated by the identifiable identified attributes or features of the unstructured data;

organizing the tagged identifiable entities into one or more normalized logs having a readable format with a prescribed schema; and reviewing the one or more normalized logs for potential security events.

16. The method of claim 15, further comprising generating training data sets for training the one or more engines.

17. The method of claim 16, further comprising updating the training data sets with security log data processed by the one or more engines.

18. The method of claim 15, further comprising dynamically analyzing sets of data from parsed or readable security logs and sets of data from raw or unstructured security logs.

* * * * *